(12) United States Patent
Mori et al.

(10) Patent No.: US 7,112,289 B2
(45) Date of Patent: Sep. 26, 2006

(54) ETCHANTS CONTAINING FILTERABLE SURFACTANT

(75) Inventors: Erik Mori, Naperville, IL (US); Brian Hong, San Pablo, CA (US); James Craig, Concord, CA (US)

(73) Assignee: General Chemical Performance Products LLC, Parsippany, NJ (US)

( * ) Notice: Subject to any disclaimer, the term of this patent is extended or adjusted under 35 U.S.C. 154(b) by 23 days.

(21) Appl. No.: 10/984,649

(22) Filed: Nov. 9, 2004
(Under 37 CFR 1.47)

(65) Prior Publication Data

US 2006/0097218 A1 May 11, 2006

(51) Int. Cl.
*C09K 13/00* (2006.01)
(52) U.S. Cl. .......................... 252/79.1; 438/292; 134/3
(58) Field of Classification Search .............. 252/79.1; 365/232
See application file for complete search history.

(56) References Cited

U.S. PATENT DOCUMENTS

| 4,517,106 A | 5/1985 | Hopkins |
| 4,761,245 A | 8/1988 | Scardera |
| 4,795,582 A | 1/1989 | Ohmi |
| 5,496,485 A | 3/1996 | Maternaghan |
| 2005/0169096 A1* | 8/2005 | Lee et al. .................... 365/232 |

* cited by examiner

*Primary Examiner*—Nadine G. Norton
*Assistant Examiner*—Patricia George
(74) *Attorney, Agent, or Firm*—Arthur J. Plantamura

(57) ABSTRACT

An improved etching and cleaning composition for semiconductor devices is provided in which the etch solution incorporates a novel surfactant comprising a combination of a linear perfluorocarboxylic acid, a cyclic amine and an aliphatic alcohol.

11 Claims, No Drawings

ETCHANTS CONTAINING FILTERABLE SURFACTANT

This invention relates to improved buffered oxide etchant and metal etchant compositions containing soluble surfactant additives. These additives are capable of maintaining reduced surface tensions for increased wetting stability and are useful in integrated circuit manufacture. Specifically, this invention relates to the utilization, in the surfactant composition, of a three-component surfactant blend comprising a combination of a linear perfluorocarboxylic acid, a cyclic alkylamine and an aliphatic alcohol. The three-component surfactant system of the invention is incorporated and finds utility in a known variety of etchants including for example: ammonium fluoride-hydrofluoric acid (HF) blends; ammonium fluoride HF—phosphoric acid (PA) blends; PA—nitric acid—acetic acid blends; PA-nitric acid-acetic acid-fluoboric acid-HF blends; PA—nitric acid—sulfuric acid—HF blends; nitric acid—sulfuric acid—HF blends; nitric acid-HF-acetic acid and nitric acid-sulfuric acid blends. Each of the foregoing compositions is available commercially from the General Chemical, Electronic Chemicals Group, Hollister, Calif.

BACKGROUND OF THE INVENTION

As integrated circuit component dimensions become smaller, physical wetting by etchant solutions on a substrate becomes more difficult. This is especially important for those buffered etchant solutions used in silicon dioxide etching, which in the absence of surfactants exhibit unacceptably high surface tension.

Due to the increasingly stringent requirements suitable silicon dioxide etchants must possess lower surface tension wherein the surfactant incorporated maintains an acceptable level of surface activity in hydrofluoric acid and ammonium fluoride etch systems.

Prior attempts have been made to produce stable aqueous solutions of surfactant containing ammonium fluoride and hydrofluoric acid etchants. For example, in U.S. Pat. No. 4,517,106 a fluoroalkylsulfonate is used to improve the wetting properties of the acid solutions. In U.S. Pat. No. 4,761,245 a nonionic alkylphenol polyglycidol is used for the same purpose.

In U.S. Pat. No. 4,795,582, it is disclosed that surfactants selected from the group consisting of aliphatic carboxylic acids and salts thereof, aliphatic amines and aliphatic alcohols are added to aqueous mixtures of ammonium fluoride and hydrofluoric acid to improve surface wetting. Among the various surfactant compounds, octylamine is disclosed in this patent as being suitable.

In U.S. Pat. No. 5,496,485 the patentee discloses the utilization of branched aliphatic amine surfactants. The addition of relatively substantial quantities, i.e., amounts in excess of 100 ppm based on the weight of etchants, are functionally required according to that patent.

The present invention provides the means to produce significantly improved surfactants from a practical standpoint of filterability, effectiveness and reduction of the surfactant quantity required.

In accordance with the invention, filtration of the surfactant must be conducted so as to reduce to a minimum the presence of particulates which may adversely affect the end use of microelectronic components processed with compositions containing the surfactant.

In general, in pilot plant runs, integration of the surfactant into the etchant solution is effected by using a rotating mixer with a mixing period of the order of about 3 to 5 minutes. Also, in pilot plant runs, to assure a reasonable period for maximum removal of undesirable particulates from the surfactant containing etchant solution (water being the solvent unless otherwise indicated), a recirculating filtration for a period of the order of at least about 12 hours is employed. The normal flow rate through the centrifugal pump associated with the recirculating filtration system is approximately one gallon per minute.

In commercial runs, i.e., in 100 pound to 3000 pound batches, for example, a rotating mixer of a kind employed in the art is used to blend the surfactant into the etchant solution using a minimum blending period of approximately 3–5 minutes. The blend is then subjected to suitable multi-pass filtration operation that is continued until the desired minimum level or elimination of undesirable particulates is attained while still retaining a minimum but sufficient quantity of surfactant to provide the desired surface tension reduction in the etchant composition.

It is apparent that the quantity of surfactant retained in the etchant, for practical reasons, is the minimum amount that provides the suitable surface tension reduction. Generally, an effective amount of surfactant retained in the filtered etchant may vary from about 10 ppm to about 100 ppm with about 35 to about 65 ppm (based on the weight of the etchant) being the more optimal quantities.

SUMMARY OF THE INVENTION

It is accordingly, an object of the present invention to provide improved silicon dioxide etching solutions having the desirable etching rates and superior wetting compared to prior art etching solutions. By incorporating in the etchants the specific surfactant of the invention, the etchants of the invention retain excellent surface active properties after filtration.

It is a further object of the invention to provide an etching solution, which after a filtration through medium of the order of 0.1 micron, yields a product in which the etchant: retains an effective level of surfactant; is essentially free of metal ions; has a superior rate of etching at etching temperatures used for prior art solutions; provides better wetting characteristics for improved etch uniformity; and does not leave residues or adversely affect photoresist adhesion.

These and other objects of the invention are provided by the addition of a novel multi-component surfactant to aqueous etching solutions of the kind described above.

The criteria for a successful surfactant comprises a chemical additive that provides:

1. Surface tension in etchant is less than or equal to 45 dynes/$cm^2$ and preferably those in which the surface tension in etchant is less than or equal to 25 dynes/$cm^2$
2. Filterability: Successful removal of sub-micron particulates through multiple pass filtration to achieve:
   10 counts maximum per ml at greater than or equal to 1.0 micron
   100 counts maximum per ml at greater than or equal to 0.5 micron
   while retaining surfactant in etchant. Encouraged for further testing if sub-micron particulates at level of $\leq 50$ counts/ml at $\geq 1.0$ micron.
3. Trace metallic contribution of surfactant to etchant is $\leq 10$ ppb for all the common metallic elements such as Al, Cr, Fe, Ca, Na, and Ni; as these are critical to the semiconductor manufacturing process.
4. Foaming: Insignificant, the height of foam column disappears in less than 5 minutes, or invisible.

A suitable surfactant should meet the criteria described in 1–4 above. Experiments were carried out in pilot scale (1 lb. to 100 lbs. batches) as well as full scale production of several batches of quantities up to 3000 lbs. in accordance with the present invention. These experiments successfully demonstrated production of suitable qualifying etchants.

The improved etchants, in accordance with the invention, are obtained by adding to tri-component surfactant system solutions of concentrations between about 0.1% and 99% by weight of the compounds selected from those described herein below as a, b, and c. The surfactant content in the etchant comprises a small amount, i.e., on the order of at least about 10 ppm. The tri-component surface active agent comprises (i) a cyclic amine, (ii) a straight chain perfluorocarboxylic acid, and (iii) an aliphatic alcohol.

DETAILED DESCRIPTION OF THE INVENTION

In accordance with the preferred embodiments of the present invention, an aqueous composition for etching and cleansing semiconductor devices is provided in which the etchant is selected from those that comprise:

(a) ammonium fluoride and hydrofluoric acid;
(b) phosphoric acid mixtures with the compounds of (a), or with at least one of the following acids of nitric, acetic, sulfuric, hydrofluoric acid, and fluoroboric acid; and
(c) mixtures of hydrofluoric acid at least one acid selected from nitric acid, acetic acid and sulfuric acid.

The novel etchants according to the invention are obtained by adding to said etchant at least about 10 ppm, based on the weight of the etchant of a surfactant comprising a blend of:

(i) an aliphatic cyclic amine of the formula

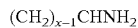

wherein x has a value of 5–8;
(ii) a linear perfluorocarboxylic acid of the formula

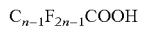

wherein n has a value of 4 to 11 and yields a perfluoramide of the formula

when reacted with the cyclic amine; and
(iii) an alcohol of the formula

wherein n is an integer from 1 to 5.

Although quantities of the above-described tri-component surfactant in amounts substantially in excess of 10 ppm, i.e., even exceeding 100 ppm, may be incorporated, such greater amounts are unnecessary from a practical standpoint. Generally, a small amount of surfactant between about 10 to about 100 ppm and preferably 15 ppm to 90 ppm, based on the weight of the etchant is sufficient. The etchant containing the surfactant of the invention when used in recirculation filtration tanks, produce an etchant in which the filterable surfactant that is retained in the etchant. Use of the surfatant also, advantageously, does not give rise to significant foaming.

The etchant compositions of the present invention are useful for etching or cleaning semiconductor devices and are particularly effective when used for etching oxide formed on the surface of silicon.

The invention will further be illustrated by reference to the following procedure and examples describing the preparation of the surfactants of the invention. In preparing the surfactants, the following reaction is applied:

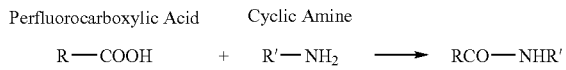

wherein R is the fluorinated hydrocarbon chain of the perfluorocarboxylic acid, R' is the cyclic hydrocarbon portion of the cyclic amine.

In the examples, a surfactant was added to a mixture of predetermined amounts of hydrofluoric acid, ammonium fluoride and deionized water to prepare an etchant composition. The prepared composition was kept standing at room temperature and test samples were periodically withdrawn to measure the change of surface tension of the composition.

An illustrative typical reaction of the perfluorocarboxylic acid and the cyclic amine of perfluorooctanoic acid and cycloheptylamine are cited as follows:

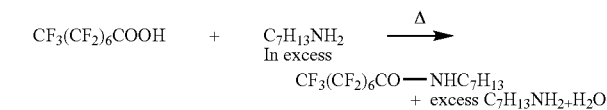

Preparation: 10% of surfactant as mixed in 50% by weight isopropyl or 2-propanol (IPA) stock solution is prepared in accordance with the reaction above using perfluorooctanoic acid and cycloheptyl amine. Composition of 100 g of 10% surfactant include:

| | |
|---|---|
| 5 g acid | (approx. 99%) |
| 5 g amine | (approx. 99%) |
| 45 g IPA | (approx. 99%) |
| 45 g $H_2O$ | |

The acid and amine were pre-mixed at room temperature and heated in boiling water bath for at least 30 minutes to speed up and to drive reaction to completion and the resulting mixture cooled to near room temperature (20–30° C.). The IPA and $H_2O$ (or a premix of IPA and $H_2O$) is then added.

The following is a typical example of Synthesis and Preparation of the Claimed Surfactants

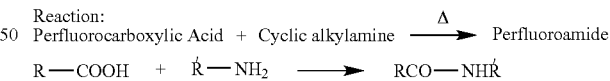

wherein R is the fluorinated hydrocarbon chain of the perfluorocarboxylic acid, Ř is the cyclic hydrocarbon portion of the cyclic amine.

i.e., reaction of perfluorooctanoic acid and cycloheptylamine

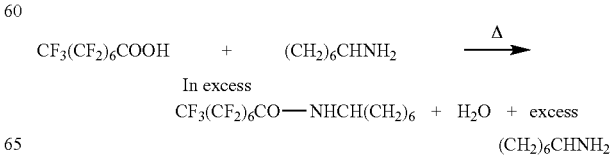

PREPARATORY EXAMPLE

An aqueous solution of 10% of surfactant in 50% 2-propanol (by weight)
  i.e., refer to the reaction above of perfluorooctanoic acid and cycloheptyl amine.
  Composition of 100 g of 10% surfactant include:
  5 g Acid (approx. 99% purity)
  5 g amine (approx. 99% purity)
  45 g 2-propanol (approx. 99% purity)
  45 g deionized $H_2O$ Various runs were conducted to demonstrate that the surfactant(s) met the desired criteria. Generally the experimental runs were carried out in pilot scale (1 lb. to 100 lbs. batches).

General Run

A preliminary testing was conducted prior to filtration to evaluate whether individual components of the claimed surfactant(s), would work individually, need modification, or require combining to give a basic understanding which would lead to synthesis of the surfactant(s) of the invention. Potential surfactant candidates were prepared and evaluated in an aqueous mixture comprised of about 35% by weight of ammonium fluoride, $NH_4F$, and about 6.3% by weight of hydrofluoric acid, HF, (defined as BOE 7-1). Dosages were varied and dependant on which surfactant was employed, incremental additions were performed, measurements of surface tension at 25° C. were made until surface tension stabilized or until the surfactant reached a saturation point (limit in solubility). The results are given in Table I below:

Later Experiments and Examples (1–4) were mainly focused on either one of the surfactant compositions H, I, J, K, L, and M (of Table I).

EXAMPLE 1

80 lbs. of an aqueous mixture comprised of 40% by weight of ammonium fluoride and 0.5% by weight of hydrofluoric acid (defined as BOE 100-1) was mixed with 500-ppm of surfactant "H" (a selected member of the claimed surfactant group as listed in Table I), by weight of the mixed etchant, and filtered through two 0.2-micron polyethersulfone (PES) filters. The surfactant mixture was not aggressively agitated, but circulated through filters runs for three days with interval samplings of approximately every four hours. The mean results are given in Table II below:

TABLE II

| Properties/Criteria | Before Filtration | After Filtration | Meet Success Criteria (Yes/No) |
|---|---|---|---|
| Surface Tension (dynes/cm$^2$) | 18 | 38 | Encouraged |
| Particulates (cts/ml) | | | |
| $\geq$1.0 micron | >3,000 | 10 | Yes |
| $\geq$0.5 micron | >10,000 | 33 | Yes |
| Foaming | Insignificant | Insignificant | Yes |

The surface tension was found to increase following filtration. Data indicates the surfactants were removed during filtration, and failed to meet one of the success criteria. Another experiment was carried out to confirm with BOE 7-1 (see Example 2).

TABLE I

| Potential Surfactants | Surface Tension (dynes/cm$^2$) | Solubility In BOE | Comments | Promising (Yes/No) |
|---|---|---|---|---|
| A. Cycloheptylamine | 72 | $\leq$400 ppm | ST too high | No |
| B. Cyclooctylamine | 65 | $\leq$600 ppm | ST too high | No |
| C. Cyclopentylamine | 65 | $\leq$400 ppm | ST too high | No |
| D. Perfluorooctanoic Acid | 20 | $\leq$100 ppm | Precipitated | No |
| E. Perfluoroheptanoic Acid | 20 | $\leq$100 ppm | Precipitated | No |
| F. Perfluorononanoic Acid | 25 | $\leq$100 ppm | Precipitated | No |
| G. Perfluoropentanoic Acid | 24 | $\leq$100 ppm | Precipitated | No |
| H. A + D | 20 | $\leq$1000 ppm | Good ST, Fairly soluble. | Yes |
| I. B + D | 20 | $\leq$500 ppm | Good ST, Fairly soluble. | Yes |
| J. C + D | 22 | $\leq$2000 ppm | Good ST, Fairly soluble. | Yes |
| K. A + E | 21 | $\leq$1000 ppm | Good ST, Fairly soluble. | Yes |
| L. B + F | 25 | $\leq$500 ppm | Good ST, Fairly soluble. | Yes |
| M. A + G | 23 | $\leq$500 ppm | Good ST, Fairly soluble. | Yes |
| N. perfluorobutyric acid + B | 40 | >1000 ppm | ST acceptable | Encouraged |
| O. perfluoroacipic acid + B | 55 | <500 ppm | ST too high | No |
| P. perfluorosuberic acid + B | 65 | <100 ppm | ST too high | No |

ST: surface tension

EXAMPLE 2

200 ppm of surfactant "H" (Table I) were added into an aqueous mixture comprising of about 35% by weight of ammonium fluoride and about 6.3% by weight of hydrofluoric acid (defined as BOE 7-1), and without agitation, the mixture was circulated through two –0.2 μm filters (PES and Teflon or otherwise known as polytetrefluoroethylene or PTFE) and the results are given in Table III below:

TABLE III

| Properties/Criteria | Before Filtration | After Filtration | Meet Success Criteria (Yes/No) |
|---|---|---|---|
| ST (dynes/cm$^2$) | 20 | 36 | Encouraged |
| PC: | | | |
| ≧1.0 μm | — | 6 | Yes |
| ≧0.5 μm | — | 82 | Yes |
| Foam | Insignificant | Insignificant | Yes |

Results similar to those of Example 1 were seen, despite different blends, concentrations of ammonium fluoride and hydrofluoric acid and different sets of filters (1 PES+1 Teflon instead of 2 PES). At this point, it was unknown whether the surfactant(s) filtered out or was not fully solubilized within the etching solution. A mechanical rotating blade mixer was introduced into the small pilot scale reactor to ensure that the contents were fully dispersed and a homogenized. Meanwhile, additional 100 ppm of surfactant "H" was added into the reaction vessel (assuming a worst scenario indicating that all surfactant(s) would filter out or fully load the capacity of the filters). Table IV below indicates an improvement of surface tension aided with a mixer following filtration.

TABLE IV

| Properties/Criteria | After Filtration | Meet Success Criteria (Yes/No) |
|---|---|---|
| ST (dyne s/cm$^2$) | 21 | Yes |
| PC: (cts/ml) | | |
| ≧1.0 μm | 6 | Yes |
| ≧0.5 μm | 54 | Yes |
| Foam | Insignificant | Yes |

Concentration of surfactant "H" in the pilot scale reactor is at 300 ppm, potentially in excess. Examples 3, 4, and 5 are an optimization of dosage and filter size variation.

EXAMPLE 3

100 ppm surfactant "H" (Table I) was added into an aqueous mixture comprised of about 35% by weight of ammonium fluoride and about 6.3% by weight of hydrofluoric acid (defined as BOE 7-1), and with aid of agitation (mixer), the resulting solution was then filtered through one 0.2 μm PES filter for approximately 24 hours. Samples were taken for surface tension and particle count measurements prior to installing a 0.21 μm Teflon filter into a second filter housing in series. Results after PES filter and after teflon filter are illustrated in Table V below:

TABLE V

| Properties/Criteria | After PES (1$^{st}$ filter) | After Teflon (2$^{nd}$ filter) | Meet Success Criteria (Yes/No) |
|---|---|---|---|
| ST (dynes/cm$^2$) | 20 | 21 | Yes |
| PC: | | | |
| ≧1.0 μm | 3 | 1 | Yes |
| ≧0.5 μm | 24 | 5 | Yes |
| Foam | Insignificant | Insignificant | Yes |

Changes in surface tension were insignificant on addition of another filter of same pore size and different material. Counts of sub-micron particulates decreased and indicated the surfactant(s) of the invention is filterable (particulate reduction while maintaining surface tension) with both PES and Teflon 0.2 μm filters.

Another conclusion from this example is that surfactant of the invention at 100 ppm concentration performs as well as 300 ppm in Example 2. Examples 4 and 5 are dosage optimization experiments with smaller filter size.

EXAMPLE 4

A single 0.1 μm PES filter was used. Increments of 10 ppm surfactant "H" were added into an aqueous mixture comprised of approximately 35% by weight of ammonium fluoride and about 6.3% by weight of hydrofluoric acid (defined as BOE 7-1) until surface tension reached around surface tension of the 100 ppm as in Example 2. The mixer was operated for approximately five minutes after each addition. The critical point was established at 50 ppm. The results are given in Table VI:

TABLE VI

| Properties/Criteria | 50 ppm Before Filtration | 50 ppm After Filtration | Meet Success Criteria (Yes/No) |
|---|---|---|---|
| ST (dynes/cm$^2$) | 20 | 21 | Yes |
| PC: | | | |
| ≧1.0 μm | 180 | 3 | Yes |
| ≧0.5 μm | 1299 | 8 | Yes |
| Foam | Insignificant | Insignificant | Yes |

Experiment 4 was repeated to confirm the dosage by adding a single injection equivalent to 50 ppm surfactant "H" into BOE 7-1, followed by 5 minutes agitation with the mixer, and circulating through one 0.2 μm Teflon filter. The results are listed in Table VII.

TABLE VII

| Properties/Criteria | 50 ppm After Filtration | Status |
|---|---|---|
| ST (dynes/cm$^2$) | 21 | Pass |
| PC: (cts/ml) | | |
| ≧1.0 μm | 2 | Pass |
| ≧0.5 μm | 11 | Pass |
| Foam | Insignificant | Pass |

Examples 1 to 4, specifically worked with the surfactant "H" (a selected member of the claimed surfactant group as listed in Table I), the pair of perfluorooctanoic acid and cycloheptyl amine. The study proceeded to investigate various homology pairs to determine whether similar results would be obtained in Example 5.

EXAMPLE 5

Surfactant pair for this experiment consisted of perfluoroheptanoic acid and cycloheptylamine, surfactant "K" (a selected member of the claimed surfactant group as listed in Table I). Identical settings as other examples (reactor, temperature, mixer), and a single 0.1 μm PES filter were employed. 50 ppm of the surfactant pair was added into BOE 7-1. The results are displayed in Table VIII.

TABLE VIII

| Properties/Criteria | Before Filtration | After Filtration | Status |
|---|---|---|---|
| ST (dynes/cm$^2$) | 18 | 20 | Pass |
| PC: | | | |
| ≧1.0 μm | 292 | 3 | Pass |
| ≧0.5 μm | 1498 | 18 | Pass |
| Foam | Insignificant | Insignificant | Pass |

EXAMPLE 6

In the pilot scale reactor, 50 ppm by weight of surfactant "H" (Table I) was added into 60 lbs. of an aqueous mixture comprised of approximately 39.5% by weight of ammonium fluoride and about 1.1% by weight of hydrofluoric acid (defined as BOE 50-1), and with aid of a mixer, the blend was filtered through one 0.2 μm PES filter. Measurements of surface tension and particulates after filtration are in set forth in Table IX.

TABLE IX

| Properties/Criteria | After Filtration | Status |
|---|---|---|
| ST (dynes/cm$^2$) | 21 | Pass |
| PC: (cts/ml) | | |
| ≧1.0 μm | 9 | Pass |
| >0.5 μm | 40 | Pass |
| Foam | Insignificant | Pass |

EXAMPLE 7

A manufacturing scale experiment was performed explicitly for product pre-qualification. A 3000 lbs. batch of an aqueous mixture comprised of approximately 34% by weight of ammonium fluoride and about 7.2% by weight of hydrofluoric acid (defined as BOE 6-1) with 50 ppm of surfactant "H" (same surfactant pair as in Examples 1–4) was produced under similar conditions as the pilot scale. The results are given in Table X below:

TABLE X

| Properties/Criteria | Before Filtration | After Filtration |
|---|---|---|
| ST (dynes/cm$^2$) | 20 | 21 |
| PC: (cts/ml) | | 1 |
| ≧1.0 μm | 576 | |
| ≧0.5 μm | 10141 | 5 |
| Foaming | Insignificant | Insignificant |

EXAMPLE 8

As in Example 7, another 3000 lbs. batch was produced and repeated 7 months after to confirm initial results. The data is shown in Table XI.

TABLE XI

| Properties/Criteria | After Filtration |
|---|---|
| ST (dynes/cm$^2$) | 20 |
| PC: (cts/ml) | |
| ≧1.0 μm | Not available |
| >0.5 μm | Not available |

EXAMPLE 9

Another manufacturing scale experiment was performed explicitly for product pre-qualification under identical settings and conditions as the pilot scale and production batches in Examples 6 and 7. In this case, however, 50 ppm by weight of surfactant "H" was blended into a 3000 lbs. batch of an aqueous mixture comprised of approximately 17% by weight of ammonium fluoride and 0.15% by weight of hydrofluoric acid (defined as BOE 50). The final results are shown in Table XII.

TABLE XII

| Properties/Criteria | After Filtration |
|---|---|
| ST (dynes/cm$^2$) | 16 |
| PC: (cts/ml) | |
| ≧1.0 μm | 36 |
| >0.5 μm | Not available |

EXAMPLE 10

A 60 lbs. aqueous mixture comprised of approximately 39.5% by weight of ammonium fluoride, about 1% by weight of phosphoric acid (defined as Blend B ammonium fluoride/phosphoric acid), and 10 ppm by weight of surfactant "H" were added. The blend was agitated with the aid of a mixer, and circulated through a 3 μm polypropylene filter for 1 hour. Surface tension and particulates of the Blend B (ammonium fluoride/phosphoric acid) were measured before and after filtration as shown in Table XIII below:

TABLE XIII

| Properties/Criteria | Before Filtration | After Filtration |
|---|---|---|
| ST (dynes/cm$^2$) | 24.6 | 24.6 |
| PC: (cts/ml) | | |
| ≧1.0 μm | 210 | 1 |
| ≧0.5 μm | 1695 | 6 |
| Foaming | insignificant | Insignificant |

EXAMPLE 11

In this run, surfactant "H" was tested with an aqueous solution of mixed etchants consisting of about 85% by weight of sulfuric acid, about 5% by weight of nitric acid, and about 1.5% by weight hydrofluoric acid. 100 ppm (Sample 1) and 200 ppm (Sample 2) by weight of surfactant "H" were mixed into two separate samples of FS Etch. The surface tension of both unfiltered samples was measured 1 hour upon batch completion and after 15 days of storage. The results are displayed in Table XIV.

TABLE XIV

|  | Surface Tension (dynes/cm$^2$) After 1 hr | Surface Tension (dynes/cm$^2$) After 15 days |
|---|---|---|
| Sample 1 | 29 | 41 |
| Sample 2 | 37 | 37 |

Surface tension of Sample 1 appears to increase over a period of time while at higher concentration of surfactant, Sample 2 shows higher surface tension 1 hour after addition of surfactant but appears stable after 15 days. In addition, some floating particulate matter was found on both samples immediately following mixing. However, the floating particulate matter decreases over the period of storage. Nevertheless, the results were encouraging and warranted further investigation.

EXAMPLE 12

Stability Tests: Shelf life of filtered samples stored at room temperature (25° C.) were studied for the following stability evaluation of surfactant "H" (Table I) from Example 3 (BOE 7-1 with 100 ppm Surfactant), Example 4 (BOE 7-1 with 50 ppm surfactant), Example 6 (BOE 50-1 with 50 ppm surfactant), Example 9 (BOE 50-1 with 50 ppm of surfactant), and Example 10 (Blend B-ammonium fluoride/phosphoric acid with 10 ppm Surfactant). Results are given in Table XV wherein composition of etchants in percentage by weight are referenced.

TABLE XV

| Retained samples from | Ammonium Fluoride (%) | HF H3P04* (%) | Surfactant "H" (ppm) | Storage period (days) | Surface tension at time of making (dynes/cm$^2$) | Surface tension after storage period (dynes/cm$^2$) |
|---|---|---|---|---|---|---|
| Example 3 | 35 | 6.3 | 100 | 30 | 21 | 22 |
| Example 4 | 35 | 6.3 | 50 | 30 | 21 | 23 |
| Example 6 | 39.5 | 1 | 50 | 120 | 21 | 21.5 |
| Example 9 | 17 | 0.15 | 50 | 90 | 16 | 16.5 |
| Example 10 | 39.5 | 1* | 10 | 150 | 24.6 | 25.1 |

*In example 10, phosphoric acid is used in place of hydrofluoric acid.

Insignificant changes of surface tension were noted over time for the etchants listed in Table XV. A difference of 1–2 dyne/cm$_2$ is likely a measurement error or an influence of air bubbles in solution that interfere with surface tension measurements.

EXAMPLE 13

Additional measurements of surface tension at 25° C. were carried out on unfiltered aqueous etchants of (1) 40% by weight ammonium fluoride, and (2) 9.2% by weight of hydrofluoric acid containing 100 ppm by weight of surfactant "H" (Table I). The results are indicated in Table XVI.

TABLE XVI

| Samples | Surface Tension (dynes/cm$^2$) |
|---|---|
| 40% ammonium fluoride (aqueous) | 21 |
| 9.2% hydrofluoric acid (aqueous) | 31 |

Although the present invention has been described in terms of specific embodiments, the invention is not to be so limited. Various changes can be made to the compositions used while still obtaining the benefits of the invention. Thus the invention is only to be limited by the scope of the appended claims.

What is claimed is:

1. An aqueous etching composition for etching semiconductor devices and materials comprising at least one etchant selected from the group consisting of: (a) ammonium fluoride and hydrofluoric acid, (b) phosphoric acid mixtures with (a), and (c) mixtures of (b) with one or more acids selected from sulfuric acid, acetic acid, nitric acid, fluoroboric acid; and containing at least 10 ppm, based on the weight of an aqueous etching composition of a surfactant comprising:

(i) cyclic alkylamine of formula $C_xH_{2x+1}N$ or $(CH_2)_{x-1}CH\ NH_2$ wherein x is an integer of 5 to 8;

(ii) a linear perfluorocarboxylic acid of the formula $C_nF_{2n-1}O_2H$ or $C_{n-1}F_{2n-1}COOH$ wherein n is an integer of 4 to 11 and yields a perfluoroamide of the formula $C_{n-1}F_{2n-1}CO\ NHCH(CH_2)_{x-1}$ wherein n=4 to 11 and x=5 to 8
   when reacted with the cyclic alkylamine and (iii) an aliphatic alcohol of the formula $C_nH_{2n+2}O$, or $C_nH_{2n+1}OH$, wherein n is an integer of 1 to 5.

2. The aqueous composition of claim 1 wherein the surfactant "ii" is an aqueous solution comprise of a blend of a cyclic alkylamine, perfluorocarboxylic acid and aliphatic alcohol and wherein the composition comprises at least 1% by weight of the cyclic alkylamine of the formula $(CH_2)_{x-1}$ $CHNH_2$, at least 1% by weight of the Perfluorocarboxylic acid of the formula $C_{n-1}F_{2n-1}COOH$, and at least 10% by weight of the aliphatic alcohol of the formula $C_nH_{2n+1}OH$.

3. The aqueous composition of claim 1 wherein the surfactant "ii" comprises about 10 ppm to about 500 ppm, of a combined quantity of cyclic alkylamine of the formula $(CH_2)_{x-1}CHNH_2$ and the perfluorocarboxylic acid of the formula $C_{n-1}F_{2n-1}COOH$, based on the weight of the etchant.

4. The aqueous composition of claim 1 wherein the cyclic alkylamine (i) is a member selected from the group consisting of cyclopentylamine, cycloheptylamine, and cyclooctylamine.

5. The aqueous composition of claim 1 wherein the linear perfluorocarboxylic acid (ii) of the formula $C_{n-1}F_{2n-1}COOH$ is a member selected from the group consisting of tridecafluoroheptanoic acid (perfluoroheptanoic acid), pentadecafluorooctanoic acid (perfluorooctanoic acid), heptafluorobutyric acid (perfluorobutanoic acid), and heptadecafluorononanoic acid (perfluorononanoic acid).

6. The aqueous composition of claim 1 wherein the alcohol (iii) of the formula $C_nH_{2n+1}OH$ is a member selected from the group consisting of 2-propanol, 1-propanol, ethanol, methanol, and 1-butanol.

7. A composition as in claim 1 wherein the aqueous etching composition is a blend of at least one of the following aqueous etchants, up to 40% by weight of ammonium fluoride, up to 49% by weight of hydrofluoric acid, up to 86% by weight of phosphoric acid, up to 96% of sulfuric acid, up to 100% of acetic acid, up to 70% of nitric acid, up to 50% of fluoroboric acid, and the surfactant.

8. A composition as in claim 1 wherein the aqueous etching composition is a blend of up to 40% by weight of ammonium fluoride, up to 20% by weight of hydrogen fluoride, deionized water and the surfactant.

9. A composition as in claim 1 wherein the aqueous etching composition is a blend of up to 40% by weight of ammonium fluoride, up to 5% by weight of phosphoric acid, deionized water and the surfactant.

10. A composition as in claim 1 wherein the aqueous etching composition is a blend of up to 85% by weight of phosphoric acid, up to 69% by weight of nitric acid, up to 15% by weight of acetic acid, optionally up to 1% by weight of hydrofluoric acid or/and up to 5% by weight of fluoroboric acid, and the surfactant.

11. A composition as in claim 1 wherein the aqueous etching composition is a blend of up to 45% by weight of hydrofluoric acid, up to 69% by weight of nitric acid, up to 60% by weight of acetic acid, up to 90% by weight of sulfuric acid, and the surfactant.

* * * * *